No. 648,047. Patented Apr. 24, 1900.
R. MORIN.
ACETYLENE GAS GENERATOR.
(Application filed May 19, 1898.)

(No Model.) 9 Sheets—Sheet 1.

Fig. 1.

Witnesses:

Inventor,
Roch Morin,
by Louis Koursolles
his atty

No. 648,047. Patented Apr. 24, 1900.
R. MORIN.
ACETYLENE GAS GENERATOR.
(Application filed May 19, 1898.)
(No Model.) 9 Sheets—Sheet 2.

Witnesses:

Inventor,
Roch Morin.

No. 648,047. Patented Apr. 24, 1900.
R. MORIN.
ACETYLENE GAS GENERATOR.
(Application filed May 19, 1898.)
(No Model.) 9 Sheets—Sheet 3.

Witnesses:

Inventor,
Roch Morin.

No. 648,047. Patented Apr. 24, 1900.
R. MORIN.
ACETYLENE GAS GENERATOR.
(Application filed May 19, 1898.)

(No Model.) 9 Sheets—Sheet 7.

Fig. 7.

Witnesses:

Inventor,
Roch Morin
by Louis Coursolles
his atty

No. 648,047. Patented Apr. 24, 1900.
R. MORIN.
ACETYLENE GAS GENERATOR.
(Application filed May 19, 1898.)

(No Model.) 9 Sheets—Sheet 8.

Witnesses: Inventor,
Roch Morin
his Atty.

No. 648,047. Patented Apr. 24, 1900.
R. MORIN.
ACETYLENE GAS GENERATOR.
(Application filed May 19, 1898.)

(No Model.) 9 Sheets—Sheet 9.

Witnesses:

Inventor,
Roch Morin.
by Louis Laursolle
his atty.

UNITED STATES PATENT OFFICE.

ROCH MORIN, OF QUEBEC, CANADA.

ACETYLENE-GAS GENERATOR.

SPECIFICATION forming part of Letters Patent No. 648,047, dated April 24, 1900.

Application filed May 19, 1898. Serial No. 681,156. (No model.)

*To all whom it may concern:*

Be it known that I, ROCH MORIN, a subject of the Queen of Great Britain, residing at Quebec, in the county of Quebec, in the Province of Quebec, in the Dominion of Canada, have invented certain new and useful Improvements in Apparatus for Generating Acetylene Gas; and I do hereby declare the following to be a full, clear, and exact description of the invention, such as will enable others skilled in the art to which it appertains to make and use the same.

The object of my present invention is to provide an improved apparatus for generating acetylene gas that will cover and meet with all the requirements of the Underwriters' Association as regards safety and that will be absolutely safe without requiring much personal attention and includes a safety-tank which is a safety-valve operated not by pressure of the gas, but by the quantity of the gas generated, this safety tank or box being operated by the rising of the main gas-storage tank, and also when once started the rising and falling of the bell of the main tank stops or starts a flow of water to the calcium carbid. This is automatic, and as the gas is generated instantaneously when the water falls on the calcium carbid so the flow of water is regulated and cut off instantaneously. Self-feeding generators are provided which are independent of each other, so that one may be charged without interfering with the working of the apparatus. It also consists of other sundry details, which will be hereinafter fully described.

Referring to the accompanying drawings, which form a part of this specification, similar characters indicate like and similar parts throughout the several views.

The whole of my apparatus, as hereinafter described, is self-contained—*i. e.*, it is all connected and stands on one base; and it consists of a main tank 20, made of galvanized sheet metal, preferably cylindrical in form, having a bottom 21 and a false bottom 22 a short distance above the bottom 21. This divides the tank into two compartments distinct from each other—the lower compartment 23 and the upper compartment 24. This upper compartment is open at the top, where it is provided with an outwardly-flaring rim 28.

In the upper part of the chamber is an inverted vessel, hereinafter called the "bell" or "gasometer" 25, the cylindrical portion 26 being of smaller diameter than the tank 20, open at the bottom and having its top 27 formed like a depressed cone, the apex being upward. This bell 25 is held in position by forked arms 83, secured to the top 27, sliding on vertical guide-rods 82, which are secured to the sides of the main tank and of which there may be two or more.

The generators, of which there are two, are placed side by side some convenient distance apart on the false bottom 22 of the tank 20 and project both at the front and the rear of the tank 20. These generators each consists of a rectangular casing 30, covered with a top 31. This top rises from the sides to a central line, like the ordinary roof of a house, only much depressed on the sides of this casing. Inside are flanges 32, on which a receptacle or basket 35 rests. This basket is made of woven wire and is pointed at the bottom in cross-section. It is secured in a frame consisting of sides 35ᵃ and ends 35ᵇ and 35ᶜ, the sides being turned in at the bottom to form running-surfaces on the brackets 32. A rod 36 is attached to the front end 35$^b$ of the frame of the receptacle or basket and passes through a stuffing-box 37 in the front 38 of the casing 30. The front 38 of the casing is secured, by means of bolts, to a flange 39. Two doors 34 and 33 are provided—a smaller or upper one, 34, and a larger or lower one, 33—the larger one, 33, for the removal of the residual lime of the calcium carbid and the upper one, 34, to examine the carbid in the baskets. At the rear end of the baskets is a step or block 43, just above which the rear wall of the hopper 41 terminates in a scraper 43$^a$ for action against the upper surface of the block 43 at such times as the basket is being moved to its rearmost position. An opening 40 is formed in the top of the casing 30 at the rear of the tank 20, and above this opening and secured to the casing 30 is placed a hopper 41, which constitutes the self-feeder. This hopper reaches to the top of the tank 20 and is provided with a door 42 near the top, through which the calcium carbid is placed in the hopper. The doors 33, 34, and 42 are preferably made circular and adapted to screw on, so as to make a gas-tight joint. The receptacle or basket 35 is made wider than the hopper 41 and projects behind it, so as to prevent any of the calcium carbid falling down at the sides or end of it. Each generator has such a hopper and self-feeder working independently one from the other.

In front of and having its top level with the top of the main tank is secured a water-tank 45, and a water-supply pipe 46, is connected with the water-main or an elevated water-storage tank, which is provided with a ball-cock 47 and supplies water to the tank. The cock 47 is operated by the floating ball 48. An outlet or overflow 49 in the upper part of this tank supplies water to the compartment 24 of the main tank. Another pipe 50 is connected to a lower tank, to be hereinafter described, and a tube 51 passes through the bottom of the tank, the top of this tube reaching above the water-line.

Figure 1:
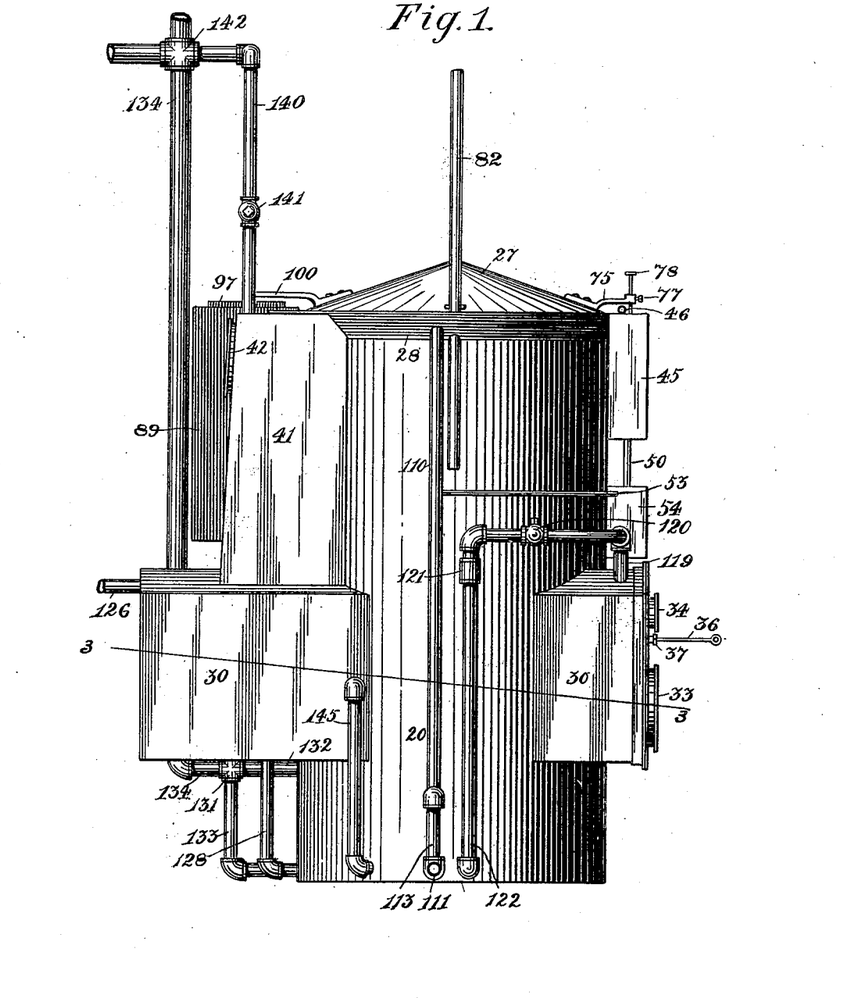
Figure 1 represents a side view of the complete apparatus.
Figure 2:
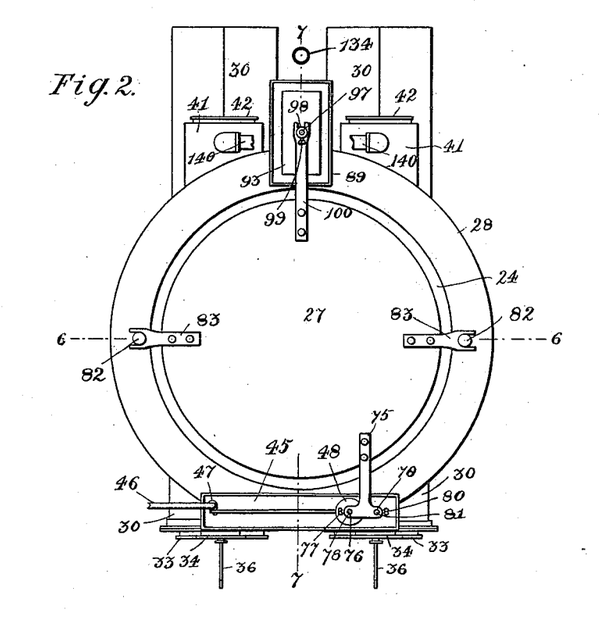
Fig. 2 is a top view of the same.
Figures 3, 14:
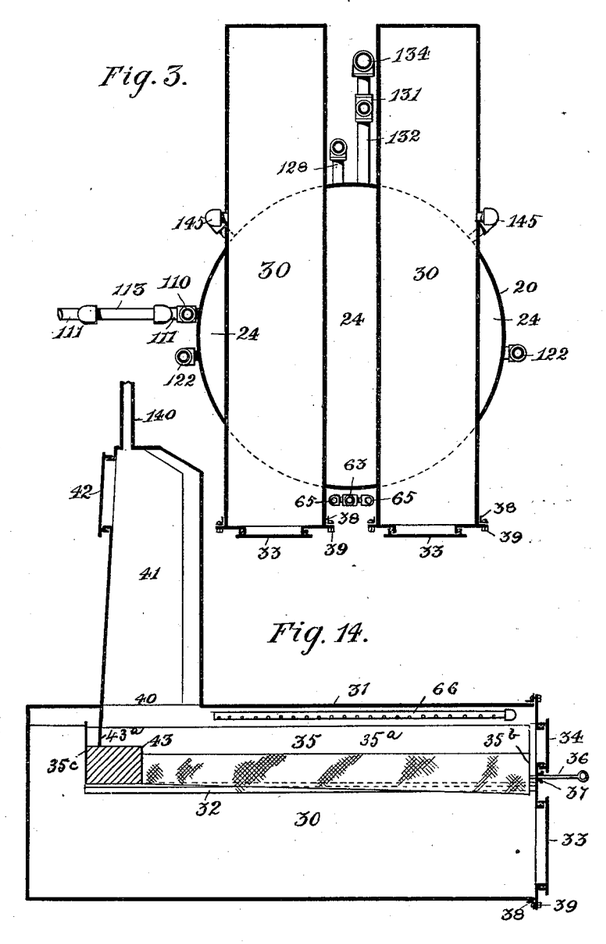
Fig. 3 is a horizontal section on line 3 3 of Fig. 1.
Fig. 14 is a transverse section through one of the generators and feed-hoppers.
Figure 4:
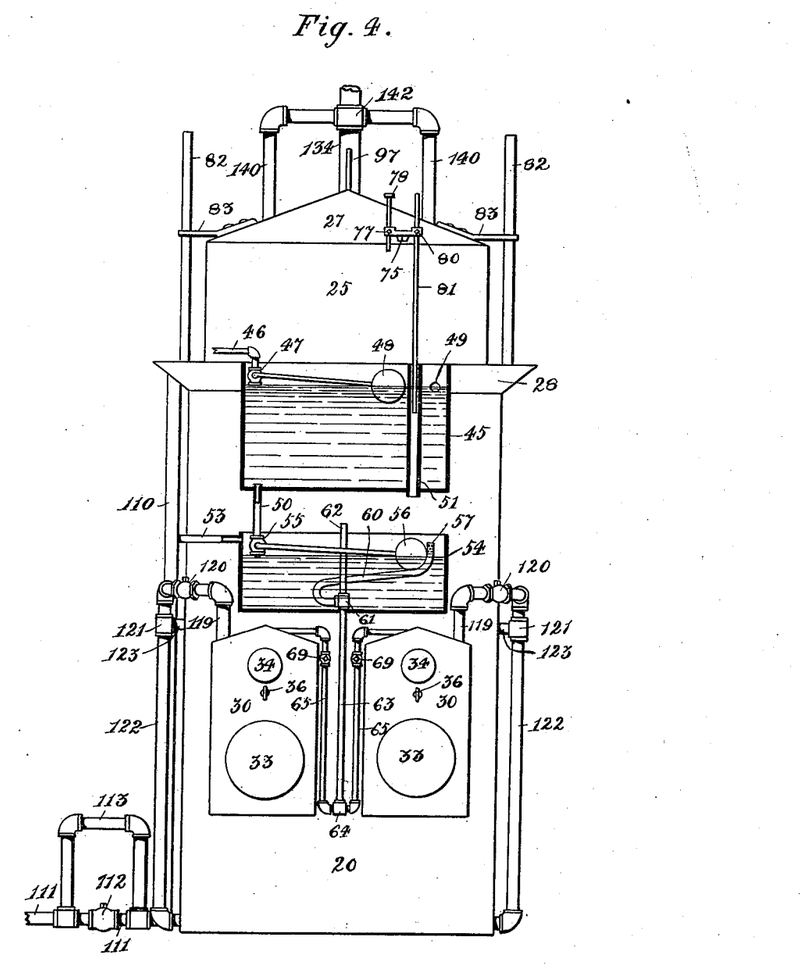
Fig. 4 is a front elevation of the device, showing the water-supply tanks in sections the bell or gas-reservoir being shown raised, as it appears when partly filled with gas.
Figure 5:
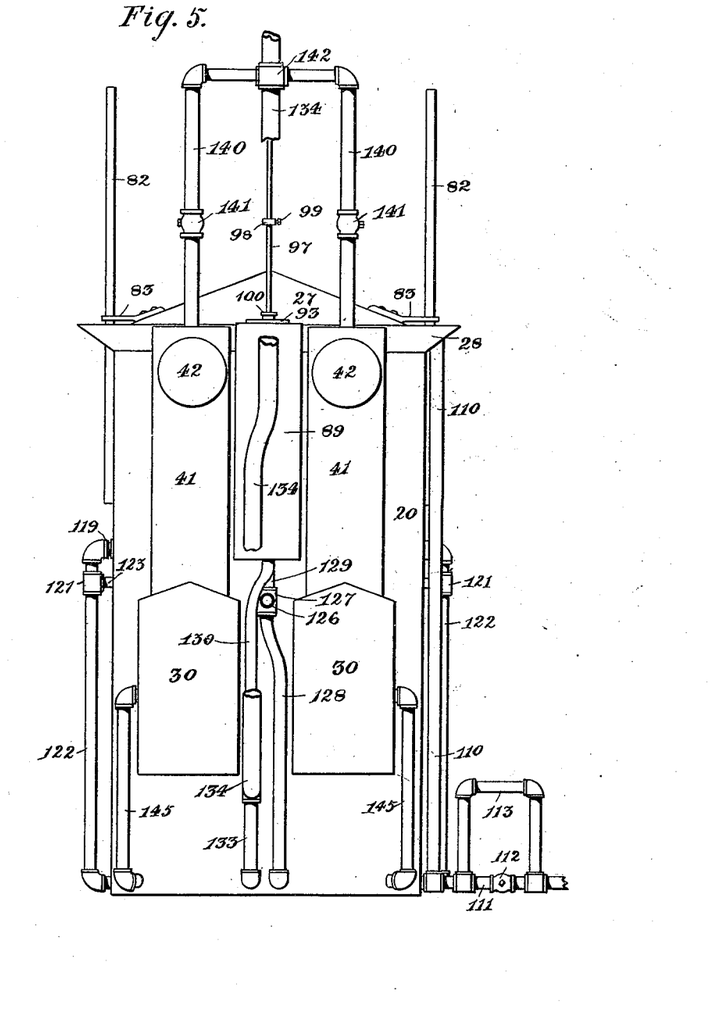
Fig. 5 is a rear elevation of the same, showing the bell or gas-reservoir as it is when nearly empty of gas.
Figure 6:
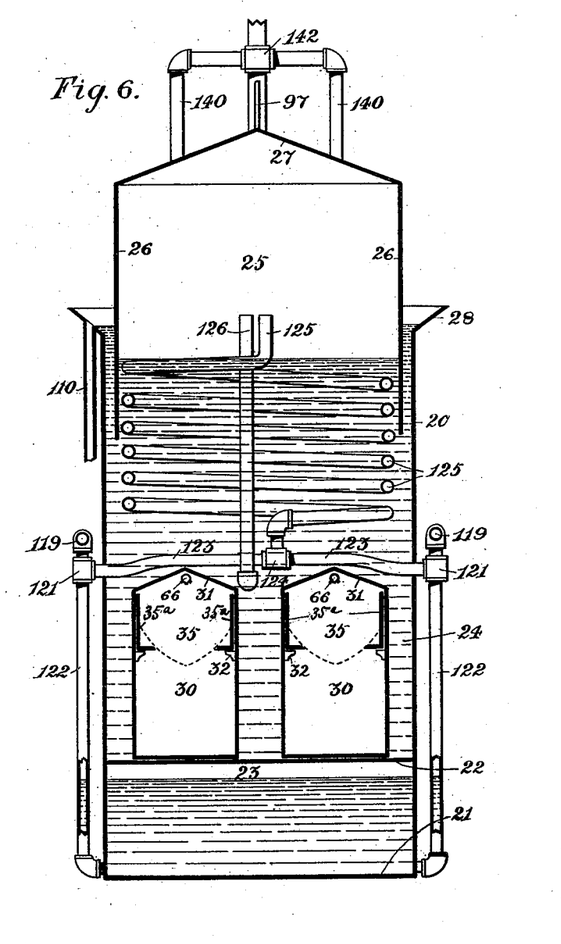
Fig. 6 is a vertical section on line 6 6 of Fig. 3, corresponding or parallel to Fig. 4.
Figure 7:
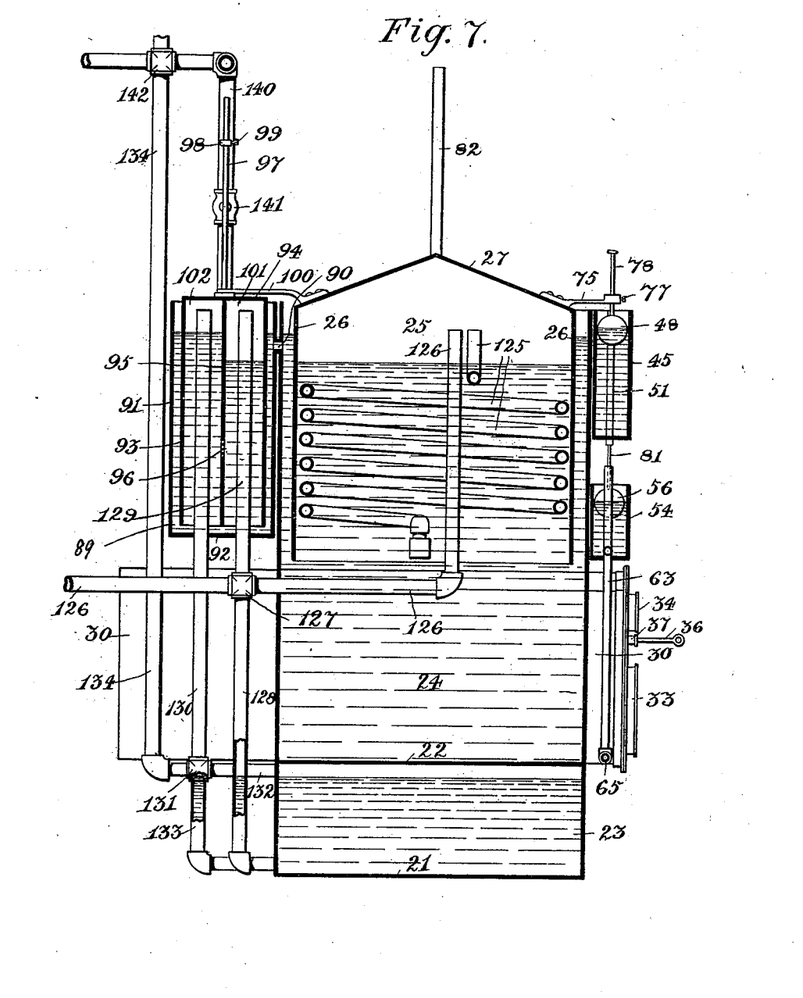
Fig. 7 is a vertical section on line 7 7 of Fig. 3 and at right angles to Fig. 6.
Figures 8, 9, 10:
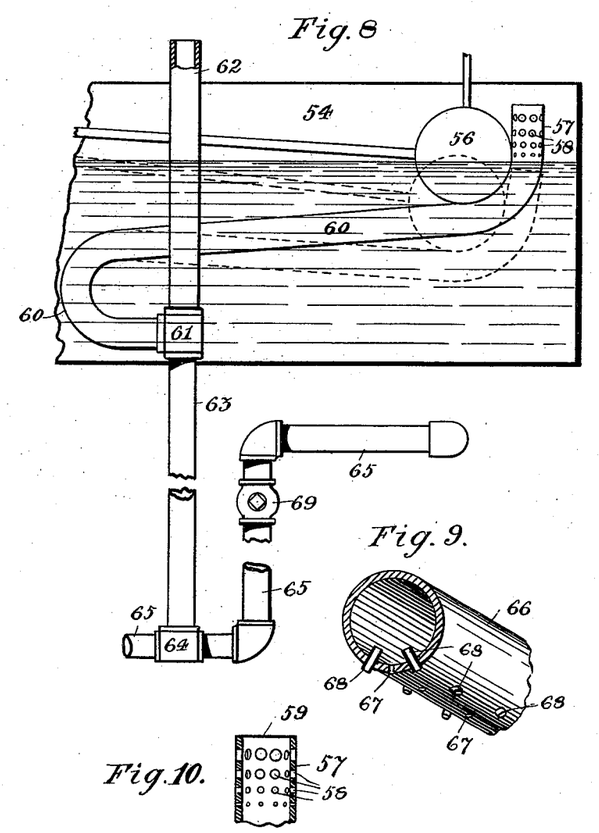
Fig. 8 is a detail view, on a larger scale, of the sprinkling arrangement.
Fig. 9 is a cross-section of the sprinkling-pipe.
Fig. 10 is a section of the intake end of the sprinkling-pipe, also on a larger scale.
Figures 11, 12, 13:
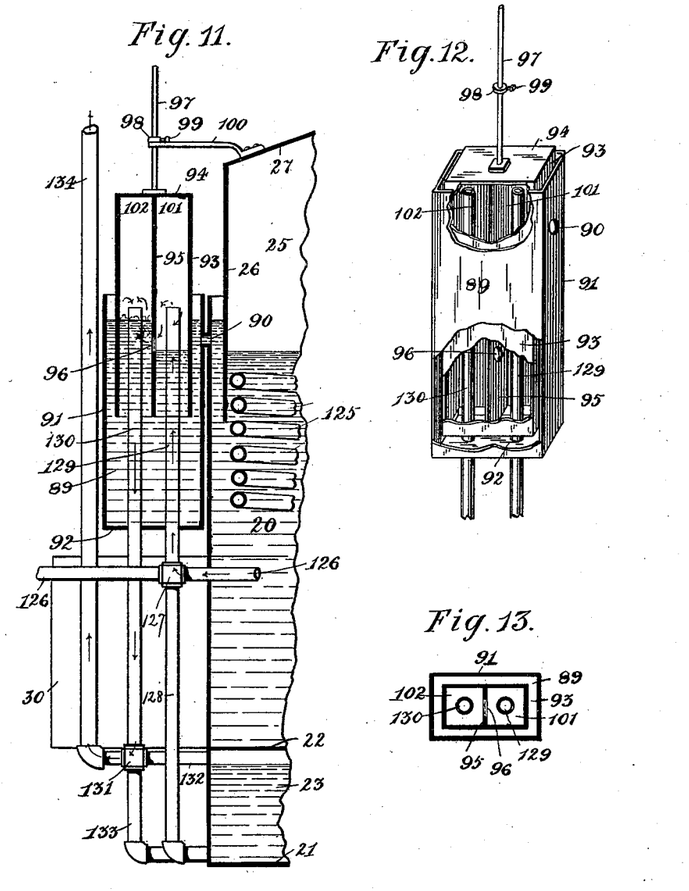
Fig. 11 is a section of the safety-tank, corresponding to part of Fig. 7, shown by arrows, the gas passing through it.
Figs. 12 and 13 are details of the safety-box.
Figure 15:
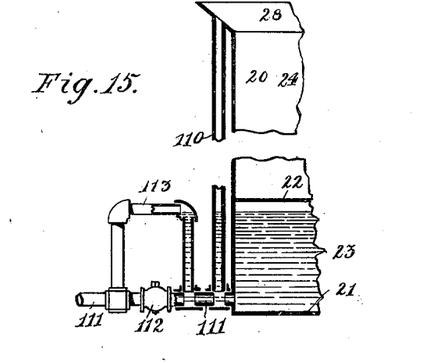
Fig. 15 is a section showing the overflow from the main tank and the water seal of the drain-pipe.

The tank 54 is placed under the tank 45 and is supplied with water by the pipe 50, a ball-cock 55 on the end of the pipe, operated by the ball 56, controlling the supply. An overflow-pipe 53 is connected to an overflow-pipe 110, to be hereinafter described. To the ball 56 is secured the end 57 of the intake-pipe for the sprinkler. (Shown in Fig. 10.) This pipe has an opening 59 at the top and several rows of perforations 58 around it. These perforations are larger at the top and gradually diminish to the lowest row, which is placed above the water-line when the ball is floating. A flexible tube 60 connects this end 57 to a T-coupling 61. A pipe 62, having its upper open end above the level of the tank, is connected to the upper opening of the T-coupling 61, and a pipe 63 runs from the lower opening, terminating in a T-coupling 64, which is at about the level of the bottom of the generators. Pipes 65 branch out from either side of the T-coupling 64, provided with the necessary bends, and pass upward and enter the generator-casings 30 near the front thereof at the top, cocks or valves 69 being interposed in the pipes 65 between the T-coupling 64 and the point where they enter the casings. The pipes 65 are each connected to a perforated sprinkler-pipe 66 in the generators. These sprinkling-pipes run nearly the entire length or as far as the hopper-openings 40 and are placed centrally under the highest portion of the casing-top. The sprinkler 66 is provided with a series of small perforations 67 along the lower portion and, as shown in Fig. 9, a series of nipples 68, having a larger bore than the perforations 67. These nipples 68 are placed slightly to either side of the lower central line of the pipe 66 and project into the pipe and out of it a short distance, as shown in the drawings.

The balls 48 and 56 do not operate in the usual way—i. e., by the lowering of the water-level—for the water-level does not sink low enough in the tanks for the ball-floats to open the valves, but are depressed by the bell in the main tank falling. In order to do this, a T-shaped bracket 75 is secured to the top 27 of the bell. The two arms of the T project over the tank 45 and are provided with perforations 76 and 79, in which vertical rods 78 and 81 are adjustably secured by means of set-screws 77 and 80. The rod 78 is so adjusted by the set-screw 77 that when the bell falls to a certain limit it presses down the ball 48, and the rod 81, adjusted by the set-screw 80, passes through the tube 51 in the tank 45 and presses on the ball 56 in the lower tank 54. This not only operates the cock 55, but it lowers the intake end of the sprinkler (which is preferably soldered to the ball 56) and causes some of the perforations in said sprinkler to be sunk below the water-line of tank 54.

The "safety-valve" is placed at the back of the tank between the two hoppers 41 and has its top level with the top of the main tank 20. This safety valve or box consists of a deep rectangular tank 89. It may be rectangular in shape, having sides 91 and bottom 92. This tank is connected with the main tank by a short pipe 90 below the water-line, so that the tank 89 is always full of water. In this tank is a bell 93, open at the bottom and having a top 94. This bell is smaller than the tank 89 and is divided by a central vertical wall or partition 95. An aperture 96 is made in this partition, which must not be less than six inches distant from the bottom thereof. To the top of the bell 93 is secured a vertical rod 97, which is provided with an adjustable collar 98, held in place by a set-screw 99. This collar is adapted to be engaged by a forked arm 100, secured on the bell 25 of the main tank, the forked portion of the arm sliding up and down the rod 97 as the bell 25 rises or falls, and when the bell 25 rises high enough the arm 100, coming in contact with the collar 98, raises the bell 93 in the safety-tank. The vertical partition 95 divides the bell 93 into two compartments or chambers, 101 being the one nearest to the main tank and 102 the other one. The air is exhausted from the main bell by raising the bell of the safety-box and allowing the said air to pass through. The air in the safety-box will go out through the escape-pipe, and thus permit the water to enter both bells.

The different compartments are connected to each other and to the drain and service pipe in the following manner: The lower chamber 23 is provided with a pipe 111, running to the drain. In this pipe is placed a cock 112, and a trap 113 having a vertical height of not less than six inches is connected on either side of the cock 112, so that when the cock is closed, which is its normal position, the water will be caused to rise to a level of six inches before it commences to run out into the drain. The cock 112 is used when it is desired to empty the chamber 23 of water, &c. An overflow-pipe 110 is run from the top of the upper chamber 23 and is connected to the pipe 111 between the tank and the trap 113.

Pipes 119 take the gas from the top of the generators in that portion thereof projecting outside of the tank in the front portion of the generators and pass one on each side of the main tank, a cock 120 being placed in each pipe. They are then provided with a T-coupling 121. One branch, 122, of each pipe runs down and is connected to the chamber 23 and enters it by the bottom, the other branches, 123, passing into the chamber 24, where they meet in a T-coupling 124 and continue upward in a coil 125, the open end of which coil-pipe ends above the water-line in the tank. The gas is taken from the bell or gasometer to the mains by the pipe 126, the open end of which commences at about the same level or height as the coil 125 ends. It passes down in the center of the coil and out at the side of the tank 20 and under the tank 89 of the safety-valve. A T-coupling 127 is here interposed, the main 126 running straight on, a branch 129 passing upward through the bottom of the tank 89 and ending in the chamber 101 above the water-level, another branch, 128, running down and entering the chamber 23 at the bottom thereof in the main tank.

An outlet-pipe 134 is provided passing out of the building, this pipe being provided for any gas that may pass the safety-valve or escape when recharging the self-feeding hoppers. A pipe 130 commences in the chamber 102 above the water-line at about the same level that the pipe 129 terminates. This pipe runs down to a T-coupling 131. From this T-coupling a horizontal branch 132 runs into and enters chamber 23 above the water line or level therein. Another branch, 133, runs down and communicates with the chamber 23 at and enters it at the bottom thereof, and the remaining branch is connected to an outlet-pipe 134.

At the side of each of the projecting rear ends of the generators 30, but below the lowest point of the receptacle or basket, is connected a pipe 145, which runs down and is connected to and enters the chamber 23 at the bottom thereof. Another pipe, 140, is connected to the top of each of the hoppers 41 and runs up and is connected by a T-coupling 142 to the outlet-pipe 134, a cock 141 being interposed in each of these pipes between the hoppers and the T-coupling.

Having now described the apparatus, the manner of operation will here follow.

In order to more fully understand the working of my apparatus, it is necessary to state that the pressure of gas in the bell or gasometer should never be more than three inches of water—i. e., the difference in the level of the water inside the bell or tank and the outside of it should never exceed three inches— and also that the liquid seals in the bottom of the tank and pipes should never be less than six inches, so that all liquid seals in the apparatus to be effective should at all times have not less than six inches of water. A liquid packing of not less than one inch must also be maintained on all sides of the bell or reservoir, so as to safely withstand the gas-pressure and prevent any escape thereof.

Before commencing the generation of the gas it is necessary to fill to their limit the tanks and pipes, which operation is done as follows: The water being turned on at the main will fill the tanks 45 and 54 and overflow from tank 45 through the outlet 49 into the upper chamber 24 of the main tank, completely submerging the generators 30 and the coil-pipe 125, the upturned end of which, however, is above the water-level. From this chamber the water flows through pipe or overflow 90 into and fills the tank 89 of the safety-valve. The water then rises in both until it reaches the level of the overflow-pipe 110 from the main-tank chamber 24. Then it flows down this pipe into the compartment or chamber 23, which it fills to the level of the top of the trap 113, through which any excess of water goes to the drain by the pipe. This trap maintains at least six inches of water in the chamber 23 and also a liquid seal of six inches of water in the following pipes—viz., 110, the overflow from 24; 122 122, the drip-pipes from the pipe leading from the generators to the coils; 128, the drip-pipe from the main gas-pipe 126; 133, the drainage or drip pipe from pipe 130; 145, the drainage or safety pipe from the generator to the chamber 23. The hoppers or self-feeders are then filled with the calcium carbid, and through them the baskets in the generators by reciprocating the rods 36, which, as the baskets are pushed back, causes the carbid to be scraped off the block 43 by the scraper 43$^a$. The rods 78 and 81 are adjusted by their respective set-screws, also the collar 98 on the rod 97 of the safety-valve. As only one generator is used at the time, if desired, the cocks on, say, the left-hand side only are opened (if the left-hand generator only is used) and the right remains closed. This allows the water to pass down the pipe 65 into the sprinkler and onto the carbid in the receptacle or basket. Gas being immediately produced by the contact of the water with the carbid, said gas passes up the pipe 119 through the condensing-coil 125 into the bell or gasometer and therefrom into the main distributing-pipe 126. If more gas is generated than is being used, the bell or gasometer will rise according to the pressure of the gas therein contained, and with it the rods 78 and 81, which have been pressing down the balls 48 and 56, thus allowing them to also rise and automatically stop the supply of water to the carbid, which immediately stops the production of gas. Should, however, the production of gas through some accident still continue, the pressure will cause the bell or gasometer to continue to rise until the forked arm 100 engages the collar 98, and by its means raises the bell of the safety-valve until the opening 96, formed in the partition 95 and connecting the two chambers 101 and 102, comes above the water-level, and thus permits of the excess of gas passing up the pipe 129 into the chamber 101 through the opening 96 into chamber 102, and from there through the pipe 130 into the waste or outlet pipe 134 and out of the building. It will be fully observed that this is accomplished simply by the increased quantity of the gas generated and not by any augmentation of pressure. This is the operation of the apparatus in brief.

The distinctive features and operation of the various parts here follow in detail. The generators are two in number and are entirely distinct and independent of one another. The receptacle or basket is placed near the top and extends beyond the opening into the hopper or self-feeder and slopes down toward the front. It is adapted to be shaken by the rod 36. This shakes the carbid into the center of the basket and draws in fresh carbid from the hopper by means of the block 43, as by pushing back the basket. The carbid resting on the step or block 43 will fall down to the bottom of the basket and be forced forward by said block as the rod is drawn out and at the same time shakes the residual lime. The inclined roof of the generator is so constructed to allow any moisture that is condensed thereon to run down the side walls to the bottom of the generator-chamber instead of dropping into the basket, as it would otherwise do, and thus generate gas when it is not required. The generators are surrounded and submerged by water to keep down the excessive heating thereof, as heat is always evolved when gas is being generated.

The sprinkling arrangement, which is shown in Figs. 8, 9, and 10, is so constructed to regulate the quantity of gas made, and thereby avoid unnecessary production. As the bell or gasometer carrying the rod 81 sinks below the limit that has been previously determined the rod presses down the ball 56 and partially or wholly submerges the end 57, according to the generation of gas needed. If very little gas is being used—say only one burner—the ball is pressed down very slightly, so that only the very smallest holes of pipe 57 are submerged, and the water passes through the flexible tube down the pipe 63 and up one or the other of the pipes 65 into the sprinkling-pipe 66, from which it issues in drops only from the small perforations 67.

By the construction of the pipes it will be seen that there is a water seal the depth of the generator in pipes 63 and 65 and that pipe 62, communicating with pipe 63, is open at the top to admit of atmospheric pressure.

It will be readily seen that as soon as the consumption of the gas stops the bell or gasometer will rise, and of course the ball thus being released will rise also, raising with it the perforations 58 of the intake-pipe above the water. Thus the production of gas is automatically stopped just as soon as the consumption ends. It will be observed that there is a pressure of gas in the generators equal to that in the bell or gasometer which would prevent the small drops of water falling until the water had risen in the pipe and filled it. This, however, is obviated by the larger nipples 68, which allow the gas to enter the pipe and exert a pressure equal to that below. When a large amount of gas is being burned, the bell is pressed down lower than before and the water enters the intake-pipe through some or all of the perforations and, if necessary, through the open top 59 of the pipe. This water runs down, as before stated, and passes out not only through the perforations 67, but also through the larger ones having the nipples 68, which in this instance direct the streams toward the sides of the basket, and consequently cause the generation of a much larger supply of gas.

To clean out the residual lime or to put in fresh carbid into the hoppers, the cocks 120 and 69 are first closed, then the cock 141 opened, and then the door 33 may be opened, if desired, to cause a draft, although of no absolute necessity. The gas in the generators and self-feeders will on opening of the cocks above mentioned immediately escape into the waste-pipe 140, and so out of the building, and if the door 33 has been opened the heavier air entering therethrough will force the gas out of the pipe 140 almost instantaneously. The feed-hoppers, however, which hold a large quantity of calcium carbid, render this operation necessary only at much longer intervals than has heretofore been the case with other apparatus for the generation of acetylene gas.

The gas generated passes through the pipe 119, enters the tank, and passes up through the condensing-coil into the bell or gasometer, and as this gas is warm it will contain more or less moisture, and by passing through the coil most of this moisture is condensed and runs down to the chamber 23 through the drip-pipe 122, and the cock 45 supplying more water than is used by the sprinklers the water circulates through the chamber 24, the coil being thus always kept cool, as a stream is always running through when the gas is being generated, the conical shape of the top of the bell or gasometer being to allow any moisture that is condensed to run down its sides or walls. Should any moisture still be left in the gas after it enters the pipe 126, a drip-pipe 128 effectually drains this and allows it to enter the chamber 23. These drip-pipes 122 and 128 are both sealed with a liquid seal as high as the level of the water in the chamber 23, wherein there must not be less than six inches of water at all times.

If the cock 69, admitting the water into the sprinkler, should not be turned off when the other generator is put into operation, the water would fill the casing 30, which might lead to accident. The safety-pipe 145, however, enters the casing below the level of the basket, and so prevents the water from rising to a level that would be in any way dangerous by carrying off the surplus of water to chamber 23 entering therein at the bottom, and a liquid seal is also maintained in said pipe 145.

The automatic safety valve or box hereinbefore described is a very important feature of my device, as when ordinary metallic safety-valves are employed and caused to be operated by pressure they are very liable to sometimes stick and clog, and therefore require to be very often tested to see if they are in perfect working order, which testing requires attendance and which testing is very often neglected, and as a consequence should they stick or clog at a critical time the result is that the building is filled with gas, if nothing of a more serious nature does not occur, through the non-working of the valves employed, while with my automatic safety valve or box nothing of this nature can possibly happen. The tank is automatically filled with water up to the level of the water contained in the main tank. The bell of the safety valve or box, as before stated, is lifted by the rising of the bell or gasometer in the main tank, this bringing the opening 96 between the two chambers above the water-line, this permitting of the escape of the gas through pipe 130, and should any water be forced into the down-pipe 130 by the gas agitating the water it will fall into the drip-pipe 133, while the gas will escape out of the building through pipe 134, the water seal in pipe 133 preventing it entering chamber 23. The reason that the bell of this safety-valve as constructed does not rise with the pressure of the gas within it, as the bell or gasometer 25 in the main tank does, is due to the fact that only one of the chambers—i. e., 101—contains gas and that the pressure of the gas it so contains is not sufficient to raise the bell by itself. Should any gas find its way into the chamber 23, it will pass out of it to the open air by pipe 132, which enters the chamber at a point above the level of water therein and which pipe 132 is connected to pipe 134, leading out of the building.

The hoppers constituting the self-feeders are also of a great advantage, as they enable the generators to use about four times as much calcium carbid without once opening them than has been done heretofore, and as there is a loss of gas each time the generators are opened this loss by the use of my self-feeders is considerably reduced, and they require less attention. Having also the whole apparatus self-contained is also an advantage, as the usual valves and cocks usually employed are entirely dispensed with.

In large apparatus should the weight of the bell or gasometer 25 be too heavy for the gas to properly lift it to the desired height and at the required pressure it may be lightened in the usual manner by attaching chains or cords to it and passing them over pulleys on the guide-rods and attaching weights to the other ends of the chains or cords, as is common practice in ordinary gasometers to counterbalance them when needed.

Having now fully described my invention and in what manner the same is to be performed, what I claim, and desire to secure by Letters Patent, is—

1. An apparatus for generating acetylene gas, consisting of a tank open at the top, a false bottom dividing the tank into two chambers, generators passing through the said tank and resting on the false bottom, baskets to contain calcium carbid in the said generator, hoppers constituting self-feeders to the said baskets, means for shaking the said baskets, gas pipes or conduits from said generators united in the upper chamber of the tank and formed into condensing-coil, the said coil terminating above the level of water in the said tank, a bell or gasometer inverted in said tank, a pipe from the said bell or gasometer conducting the gas to the mains, a safety valve or box interposed in the gas-pipe from the gasometer, the said safety-valve being operated by the rising and falling of the bell or gasometer, a water-tank adapted to automatically supply the said main tank, upper and lower chamber, and safety-valve tank with water, so as to submerge the generators and condensing-coil, a water-tank under the before-mentioned water-tank and supplied therefrom, adapted to supply water to the sprinkler in the generators, sprinkler adapted to supply automatically water to the calcium carbid, the said water-tanks being operated by the rising and falling of the bell or gasometer, the drip-pipes connected to the lower chamber of the main tank, and a trap in the drainage-pipe of the said lower chamber, adapted to maintain an efficient water seal to all of the said drip-pipes, substantially as set forth and described.

2. An apparatus for generating acetylene gas, consisting of a main tank, gas-generators placed in the said tank, projecting at the front and rear thereof, hoppers connected to the said generators on the projecting rear portion, receptacles capable of being shaken placed in the said generators and supplied from the said hoppers, means for supplying water to the said receptacles, gas-tight doors in apertures in front of the said generators, gas-tight feed-doors near the top of said hoppers, escape-pipes from the top of the said hoppers provided with cocks, gas-pipes from the said generators into the tank, cocks interposed in the said gas-pipes, a condensing-coil in the said tank connected to the said pipes, an inverted bell or gasometer in said tank, an outlet gas-pipe from said gasometer and means for supplying water to the said tank and submerging the said generators and condensing-coil, substantially as set forth and described.

3. A safety-valve for acetylene-gas generators consisting of a tank full of water, an inverted bell in said tank, a vertical partition in said bell, dividing it into two compartments or chambers, the said vertical partition having therein an aperture or opening near its lower edge, but not too near to destroy an efficient water seal, an inlet-pipe passing up through the bottom of the said tank and finishing above the water-line in one chamber, an outlet or waste pipe commencing above the water-line in the other chamber and passing out through the bottom of the said tank, the said pipes being adapted to be in communication with each other when the orifice in the partition is, by the bell being raised, above the water-line, substantially as set forth.

4. In an apparatus for generating acetylene gas, the combination with the main tank having an inverted bell or gasometer 25, adapted to rise as the gas is supplied to it, a forked arm secured to the said bell or gasometer, of the tank 89 of the safety-valve, a pipe 90 connecting the said main tank with the said tank 89, an inverted bell 93 in said tank 89, a vertical partition 95 having an aperture or orifice 96 near its lower edge, at the distance specified; pipes 129 and 130 passing into the said tank and entering the chambers 101 and 102, formed in the said bell, a vertical rod secured to the top of the bell 93, and an adjustable collar secured on said rod and adapted to be engaged by the forked arm on bell or gasometer 25, substantially as set forth.

5. In an apparatus for generating acetylene gas, the combination with the main tank and bell or gasometer 25; a bracket or arm 75 secured to the top of the said bell or gasometer, a vertical rod 78 held adjustable in the said arm, of the water-tank 45, a ball-cock 47 supplying said tank, a ball 48 and a connection between the said water-tank and main tank, the said ball 48 being operated or depressed by the rod 78, substantially as set forth.

6. In an apparatus for generating acetylene gas, the combination with the main tank, having a bell or gasometer 25 in said main tank, as described, a bracket 75 secured on said bell 25, vertical rods 78 and 81 in said bracket made adjustable therein, a water-supply tank 45 secured to the said main tank and connected therewith, of a water-tank 54 secured to the said main tank below the tank 45, a supply-pipe 50 from the tank 45, a ball-cock 55 and ball 56, the said ball being operated or depressed by the rod 81, the perforated end of a pipe supplying the sprinkler in the generators, secured to the ball 56, and an overflow 53 from the said tank 54, substantially as set forth.

7. In an apparatus for generating acetylene gas, the combination with the tank 54 having supply-pipe operated with a ball-cock, the ball 56 of which is adapted to be depressed by the falling of the gasometer, of the perforated end of a pipe 57 secured to the ball 56, having an open end 59, and a series of perforations 58 being larger at the top and diminishing as they descend, a flexible tube 60, secured to the said perforated end, vertical pipes 62 63 open at the top, the said flexible tube being connected to this tube, a T-coupling at the lower end of this pipe, two vertical pipes 65 running up from this T-coupling, adapted to be connected with the sprinklers 66, and valves 69 interposed in said pipes 65, substantially as set forth.

8. In an apparatus for generating acetylene gas, the combination with a tube having perforations on its end, those at the upper part being larger than those below, of a sprinkling-pipe connected with the said upper end, and having a series of small perforations at its lower side and a series of nipples at either side of the said perforations, of larger bore, for the purposes described and set forth.

9. A sprinkling-pipe in an acetylene-gas generator, having perforations in its lower edge and apertures above the level of the said perforations to admit the pressure of gas in the said generator to the said sprinkling-pipe, substantially as set forth.

10. In an apparatus for generating acetylene gas, the combination with a tank containing generators and condensing-coil, of a water-supply tank adapted to automatically supply a continuous stream of water to the said tank containing the generators and condenser, substantially by the means described when the gas is being generated, as set forth.

11. In an apparatus for generating acetylene gas, the combination with the generator-casings 30 having ledges or brackets on the sides thereof, of the receptacle 35 constructed of open material as woven wire, resting and adapted to slide on the said ledges or brackets; a rod 36 secured to the front end of the said receptacle and passing through the front of the said casing, and a stuffing-box 37, in the said casing through which the said rod passes, the receptacle 35 of less length than its casing 30, and provided at its rear end with a block 45 and the generator-casing having a hopper near its rear end, the back of the said hopper being adapted to act as a scraper, substantially as set forth.

12. In an apparatus for generating acetylene gas, the combination with the hopper 41, of the casing 30, an inclined roof on said casing, the ridge or highest point of said roof running centrally and longitudinally of said casing, a sprinkling-pipe running under the highest part of said roof, a receptacle adapted to be shaken resting on ledges or brackets, a block or step 43 at the rear of said receptacle, a door above the level of the said receptacle in the front of the said casing, a door below the said receptacle in the front of the said casing and a pipe 145 from the casing below the bottom of the receptacle and communicating with the drain, the said pipe being provided with a liquid seal, substantially as set forth.

13. In an apparatus for generating acetylene gas, the combination with the main tank divided into two chambers by the false bottom 22, of the overflow-pipe 110, connecting the top of the upper chamber 24 with the bottom of the lower one 23, a drain-pipe 111 from the lower chamber to the drain, a trap 113 adapted to keep a certain level of water in the said lower chamber, and a cock interposed between the legs of the said trap, substantially as set forth.

In testimony whereof I have affixed my signature in the presence of the two undersigned witnesses.

ROCH MORIN.

Witnesses:
VICTOR L. EMEIUX,
J. B. MORIN.